United States Patent
Schmidt et al.

(10) Patent No.: US 9,548,007 B2
(45) Date of Patent: Jan. 17, 2017

(54) DISPLAY BOARD ASSEMBLY

(71) Applicant: Educational Equipment Corp., Kent, OH (US)

(72) Inventors: Carl Schmidt, Minerva, OH (US); Richard Garman, Uniontown, OH (US)

(73) Assignee: Educational Equipment Corporation, Kent, OH (US)

( * ) Notice: Subject to any disclaimer, the term of this patent is extended or adjusted under 35 U.S.C. 154(b) by 386 days.

(21) Appl. No.: 14/186,456

(22) Filed: Feb. 21, 2014

(65) Prior Publication Data
US 2015/0243194 A1  Aug. 27, 2015

(51) Int. Cl.
*B43L 1/00* (2006.01)
*G09F 7/20* (2006.01)
*F16M 13/02* (2006.01)
*G09F 15/00* (2006.01)

(52) U.S. Cl.
CPC .............. *G09F 7/20* (2013.01); *F16M 13/022* (2013.01); *G09F 15/0018* (2013.01); *G09F 15/0025* (2013.01); *G09F 2015/0093* (2013.01)

(58) Field of Classification Search
USPC ............ 434/408, 413, 428, 430; 40/606.14; 248/124.1, 298.1, 323, 434, 480
See application file for complete search history.

(56) References Cited

U.S. PATENT DOCUMENTS

| | | | | | |
|---|---|---|---|---|---|
| 627,396 | A | * | 6/1899 | Daly | B43L 1/04 40/491 |
| 956,656 | A | * | 5/1910 | Frost | E04D 13/076 174/2 |
| 956,696 | A | * | 5/1910 | Frost | A47G 25/746 211/85.3 |
| 1,099,748 | A | * | 6/1914 | Hopkins | B43L 1/04 40/491 |
| 1,931,796 | A | * | 10/1933 | Hoffman | E05D 15/063 16/105 |
| 3,178,834 | A | * | 4/1965 | Dyer | B43L 1/06 434/413 |
| 3,363,871 | A | * | 1/1968 | Slazik | A47B 97/001 248/451 |
| 4,561,359 | A | * | 12/1985 | Duce | B65G 9/002 104/107 |
| 5,697,595 | A | * | 12/1997 | Sperber | A47B 97/001 248/125.1 |
| 6,058,656 | A | * | 5/2000 | Bischof | E05D 15/0608 16/106 |
| 6,139,331 | A | * | 10/2000 | Owen | G09B 29/001 434/408 |

(Continued)

*Primary Examiner* — Kurt Fernstrom
(74) *Attorney, Agent, or Firm* — Renner Kenner Greive Bobak Taylor & Weber

(57) ABSTRACT

A display board assembly includes a map rail and a supplemental display board mounted thereto. The map rail includes a top track defined by a top support rail and a top guard rail, and a bottom track defined by a bottom support rail and a bottom guard rail. The supplemental display board includes a wheeled mounting assembly on a rear surface thereof, the wheeled mounting assembly including: a top wheel forced to engage the top track and confined by the top guard rail, and a bottom wheel forced to engage the bottom track and confined by the bottom guard rail, wherein the supplemental display board is slidable on the top wheel and bottom wheel to different lateral positions on the map rail.

15 Claims, 13 Drawing Sheets

(56) References Cited

U.S. PATENT DOCUMENTS

| | | | | |
|---|---|---|---|---|
| 6,328,571 B1 * | 12/2001 | Dricken | ............... | A47B 97/001 |
| | | | | 434/408 |
| 8,069,598 B2 * | 12/2011 | Garcia | ...................... | G09F 7/18 |
| | | | | 108/145 |
| 8,899,990 B2 * | 12/2014 | Helton | ...................... | G09F 7/04 |
| | | | | 434/365 |

* cited by examiner

DISPLAY BOARD ASSEMBLY

FIELD OF THE INVENTION

The present invention generally resides in the art of display boards. In some embodiments the present invention relates to display board assemblies wherein a supplemental display board is slidingly received on a map rail. In other embodiments, the present invention relates to display board assemblies wherein a supplemental display board is secured to a map rail on a primary display board. Although not limited to or by any particular display board, the present invention has particular application in chalkboards and marker boards bearing map rails.

BACKGROUND OF THE INVENTION

The present invention generally relates to display boards. Perhaps the most common display boards are chalkboards and marker boards employed in classrooms throughout the world. The present invention is particularly applicable to (but not limited to) these types of primary display boards. Typically, these display boards include an extrusion known as a "map rail" as part of the framing system for the board. The present invention teaches supplemental display boards that slidingly engage the map rail and can be easily secured to and removed therefrom.

An exemplary map rail is shown in FIG. 1 and designated by the numeral 10. FIG. 2 shows a map rail 10 secured to a primary display board 11. The map rail 10 includes a base plate 12 from which extends at upper end thereof a mounting bracket 14. Mounting bracket 14 consists of a top flange 16 that serves to extend over the width of a display board, such as a marker board. A rear flange 18 extends from the top flange 16 to lie against the rear surface of the primary display board 11 to facilitate securing the map rail 10 to a primary display board 11. Fasteners may be employed as well.

The base plate 12 runs down the front face of the primary display board 11 and separates a top track 20 from a bottom track 22. The top track 20 is defined by a top support rail 24 and a top guard rail 26 extending upwardly from a distal end of the top support rail 24. Similarly, the bottom track 22 is defined by a bottom support rail 28 and a bottom guard rail 30 extending downwardly from a distal end of the bottom support rail 28. The top support rail 24 and bottom support rail 28 are offset and typically receive a cork material C therebetween.

As seen in FIG. 3, these map rails can be used to receive various types of clips that engage the map rail by wrapping around the top and bottom guard rails. As also seen, the map rails may come in different forms and, instead of securing to a primary display board, may secure directly to a wall W.

Regardless of the particular form or whether it is mounted to a wall or a primary display board, the map rail provides the following salient features: a top track defined by a top support rail and a top guard rail, and a bottom track defined by a bottom support rail and a bottom guard rail.

Particularly in the context of chalkboards or marker boards employed in the classroom, it is common to secure a supplemental display board thereto. Supplemental display boards may include maps (hence the common name "map" rail), graph boards, polar coordinate boards and other boards bearing particular information suitable for classroom instruction. Indeed, some supplemental display boards may simply provide additional chalkboard/marker board surface area. In the 1940's, such supplemental display boards began appearing as horizontal sliding boards that fit over the primary display board and slide horizontally relative thereto, thus providing additional surface area and being able to slide to expose or cover information on the primary board, as necessary. Such movable boards require custom tracks and hanging apparatus such as that shown in FIG. 4, wherein two supplementary boards are shown slidingly movable relative to a primary board 11 in light of the use of a specialized track receiving different hanging apparatus for each supplemental board.

Because map rails are quite common, whether mounted to a primary display board or to a wall, the art would benefit from display systems that beneficially employ the map rail. The present invention is directed to such display assemblies.

SUMMARY OF THE INVENTION

A first embodiment of this invention provides a display board assembly comprising: a map rail including: a top track defined by a top support rail and a top guard rail, and a bottom track defined by a bottom support rail and a bottom guard rail; and a supplemental display board having a wheeled mounting assembly on a rear surface thereof, said wheeled mounting assembly including: a top wheel forced to engage said top track and confined by the top guard rail, and a bottom wheel forced to engage said bottom track and confined by the bottom guard rail, wherein the supplemental display board is slidable on said top wheel and bottom wheel to different lateral positions on said map rail.

A second embodiment provides a display board assembly as in the first embodiment, wherein said wheeled mounting assembly includes a spring urging said top wheel to engage said top track and said bottom wheel to engage said bottom track.

A third embodiment provides a display board assembly as in either the first or second embodiment, wherein said wheeled mounting assembly includes a mounting rail, said top wheel and said bottom wheel being mounted to said mounting rail.

A fourth embodiment provides a display assembly as in any of embodiments 1-3, wherein said mounting rail is pivotally mounted to said supplemental display board at a pivot point, and said spring is secured to said mounting rail and said supplemental display board to bias said mounting rail in a first direction about said pivot point.

A fifth embodiment provides a display assembly as in any of embodiments 1-4, wherein said mounting rail further includes a handle portion manipulated in a second direction about said pivot point to rotate said mounting rail counter to the bias of said spring.

A sixth embodiment provides a display assembly as in any of embodiments 1-5, wherein said top wheel and said bottom wheel are mounted to said mounting rail such that said handle portion is capable of manipulation to rotate said mounting rail such that said top wheel and said bottom wheel are moved to a vertical separation distance such that said top wheel clears said top guard rail and said bottom wheel clears said bottom guard rail so as to no longer be confined thereby and permit removal of the supplemental display board.

A seventh embodiment provides a display assembly as in any of embodiments 1-6, wherein said wheeled mounting assembly includes a mounting rail, said top wheel mounted to said mounting rail.

A eighth embodiment provides a display assembly as in any of embodiments 1-7, wherein said wheeled mounting assembly includes a spring acting between said mounting rail and said supplemental display board, said spring forcing said top wheel in a direction downward from a top of said supplemental display board.

A ninth embodiment provides a display assembly as in any of embodiments 1-8, wherein said wheeled mounting assembly includes: a second bottom wheel forced to engage said bottom track and confined by the bottom guard rail; a left side wheel arm having a proximal end and a distal end, said proximal end being pivotally mounted to said mounting rail such that movement of said mounting rail causes said left side wheel arm to move; and a right side wheel arm having a proximal end and a distal end, said proximal end being pivotally mounted to said mounting rail such that movement of said mounting rail causes said right side wheel arm to move; wherein said bottom wheel is secured to said distal end of said left side wheel arm and said second bottom wheel is secured to said distal end of said right side wheel arm guide.

A tenth embodiment provides a display assembly as in any of embodiments 1-9, wherein said left side wheel arm is confined in movement by a left side arm guide positioned between said proximal end and said distal end of said left side wheel arm, and said right side wheel arm is confined in movement by a right side arm positioned between said proximal end and said distal end of said right side wheel arm, such that, when movement of said mounting rail causes said right side wheel arm to move, contact between said right side wheel arm and said right side arm guide causes said right side wheel arm to pivot relative to said mounting rail, and, when movement of said mounting rail causes said left side wheel arm to move, contact between said left side wheel arm and said left side arm guide causes said left side wheel arm to pivot relative to said mounting rail.

A eleventh embodiment provides a display assembly as in any of embodiments 1-10, wherein said supplemental display board hangs from said map rail on said top wheel, and said spring applies a downward force to said mounting rail and said top wheel relative to the supplemental display board, said downward force being transferred to upward force on said bottom wheel through said left side transfer arm and said left side arm guide and said downward force being transferred to upward force on said second bottom wheel through said right side transfer arm and said right side arm guide so as to pinch the map rail between the top wheel and the bottom and second bottom wheels.

A twelfth embodiment provides a display assembly as in any of embodiments 1-11, wherein said spring biases said mounting rail such that pressing downwardly on the supplemental display board to place weight on said top wheel against said top support rail moves said mounting rail upwardly relative to said supplemental display board and this upward movement is transferred to downward movement of said bottom wheel through interaction of said left side transfer arm and said left side arm guide and this upward movement is transferred to downward movement of said second bottom wheel through interaction of said right side transfer arm and said right side arm guide such that said bottom wheel and said second bottom wheel are moved to a vertical separation distance from said top wheel such that said bottom wheel and aid second bottom wheel clear said bottom guard rail so as to no longer be confined thereby and permit removal of the supplemental display board.

A thirteenth embodiment provides a display assembly as in any of embodiments 1-12, further comprising a primary display board, said map rail mounted to said primary display board.

A fourteenth embodiment provides a display assembly as in any of embodiments 1-13, wherein said supplemental display board includes a board supporting wheel that engages a face of the primary display board to prevent contact between the supplemental display board and the face of the primary display board.

DETAILED DESCRIPTION OF ILLUSTRATIVE EMBODIMENTS

Figure 1:
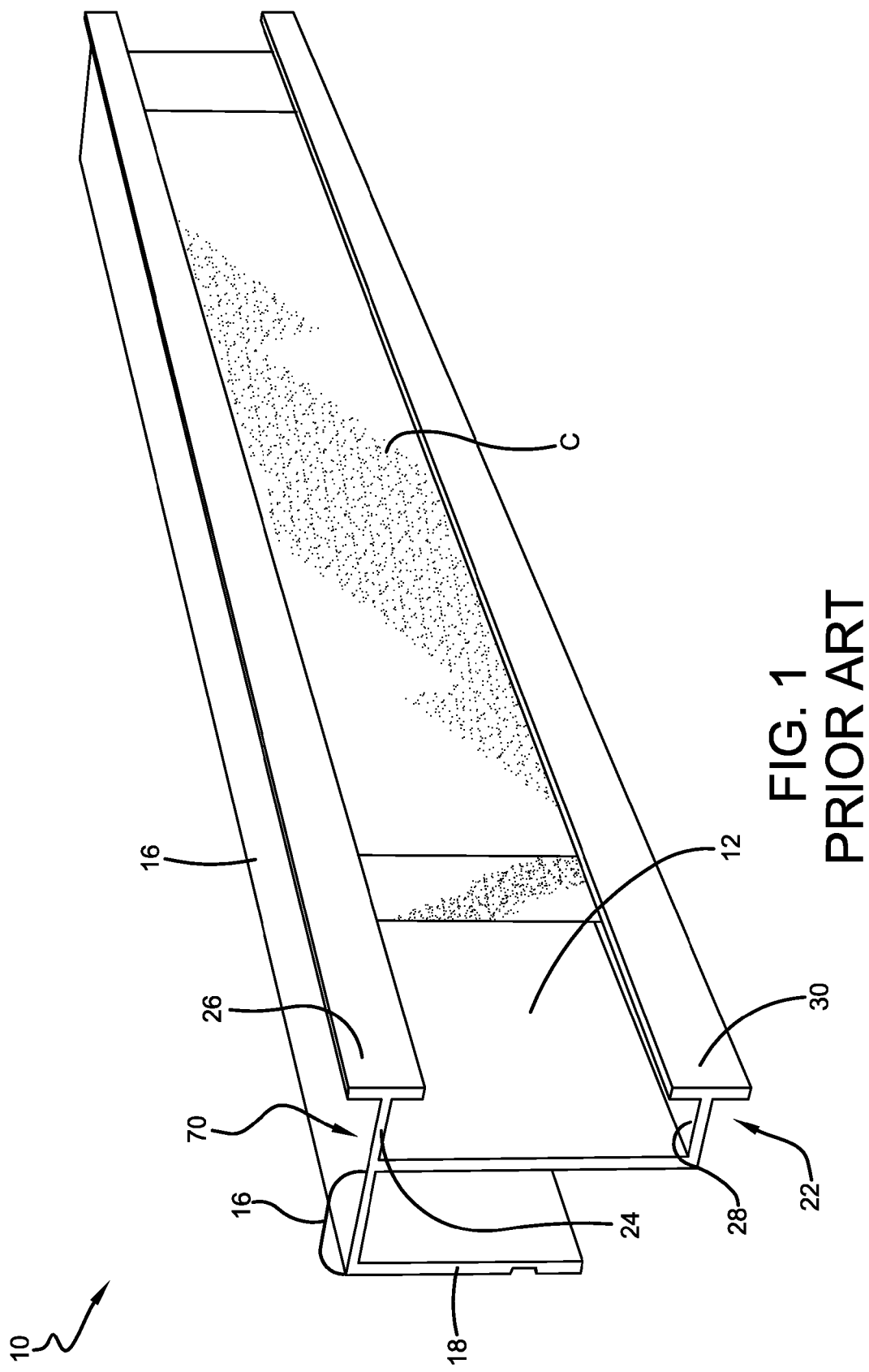
FIG. 1 is a perspective view of a prior art map rail.
Figure 2:
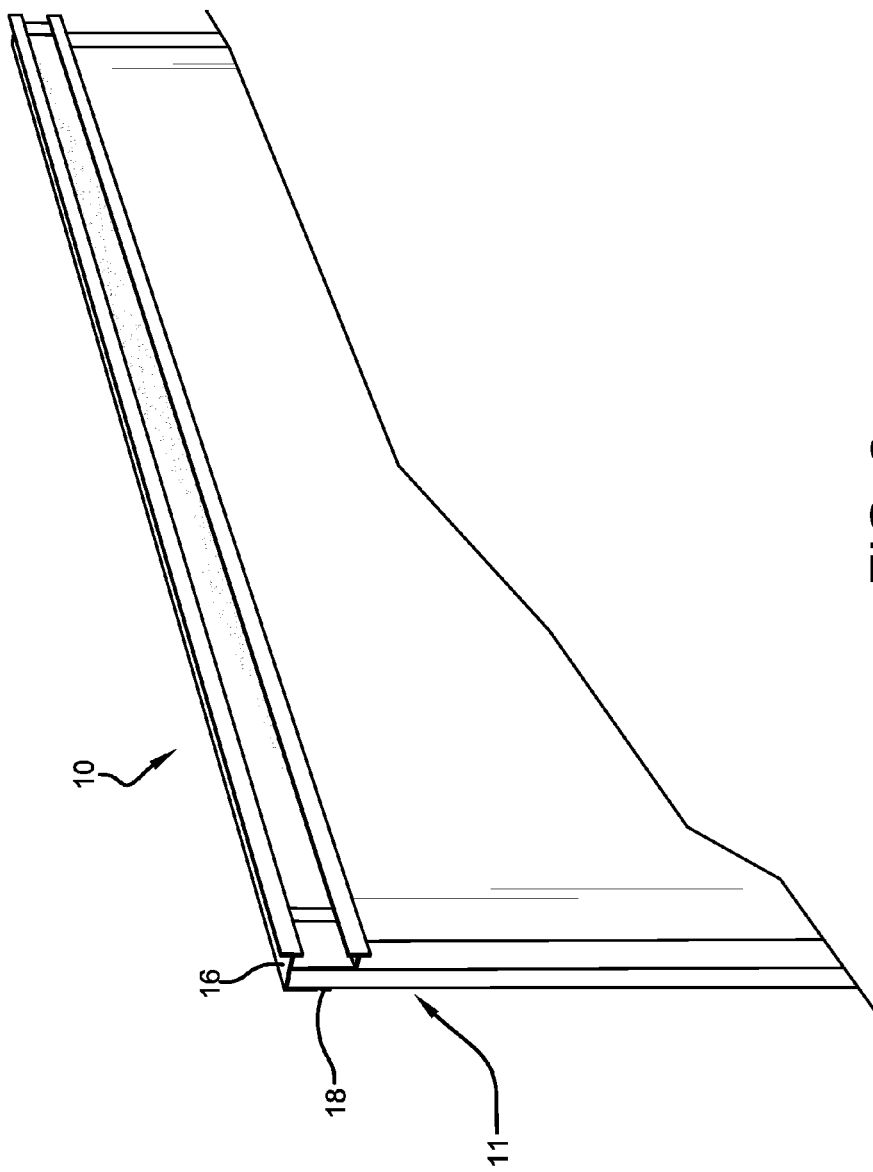
FIG. 2 is a perspective view showing the prior art map rail of FIG. 1 mounted to a primary display board.
Figure 3:
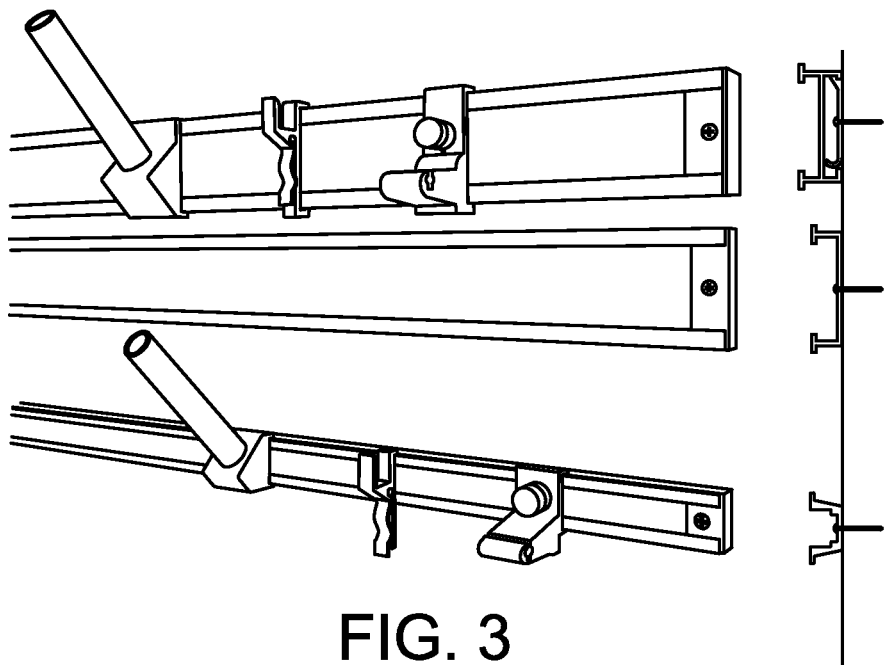
FIG. 3 shows alternative embodiments of prior art map rails, showing different common items secured thereto and exemplifying that such map rails can be employed directly on a wall W as opposed to a primary display board.
Figure 4:
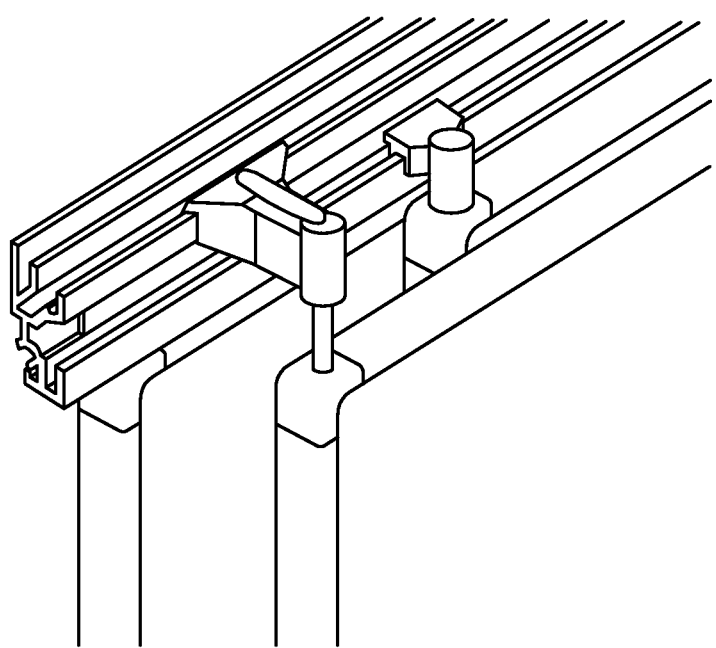
FIG. 4 is a perspective view showing relevant portions of a prior art slidable board system requiring specialized track and hanging apparatus.
Figure 5:
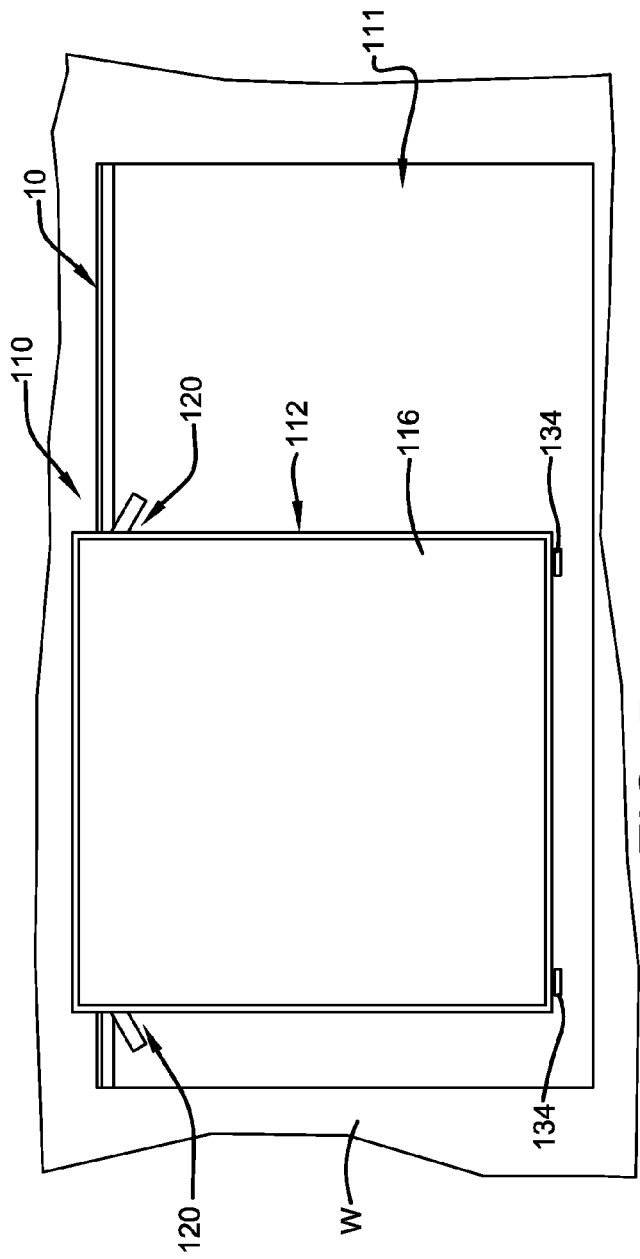
FIG. 5 is a front elevation view of a first embodiment of a display board assembly in accordance with this invention.

Referring now to FIG. 5, a first embodiment of a display assembly in accordance with the present invention is shown and designated by the numeral 110. This display assembly 110 includes a supplemental display board 112 mounted to a map rail 10 that is secured to a primary display board 111 that is, in turn, appropriately secured to a wall W. It will be appreciated that map rail could instead be mounted directly to a wall W to provide a separate embodiment of a display assembly in accordance with this invention. Of course, the disclosure of the securing of the supplemental display board 112 to a map rail 10 on a primary display board 111 will be sufficient for also teaching the concept of securing such a supplemental display to a map rail secured directly to a wall.

Figure 6:
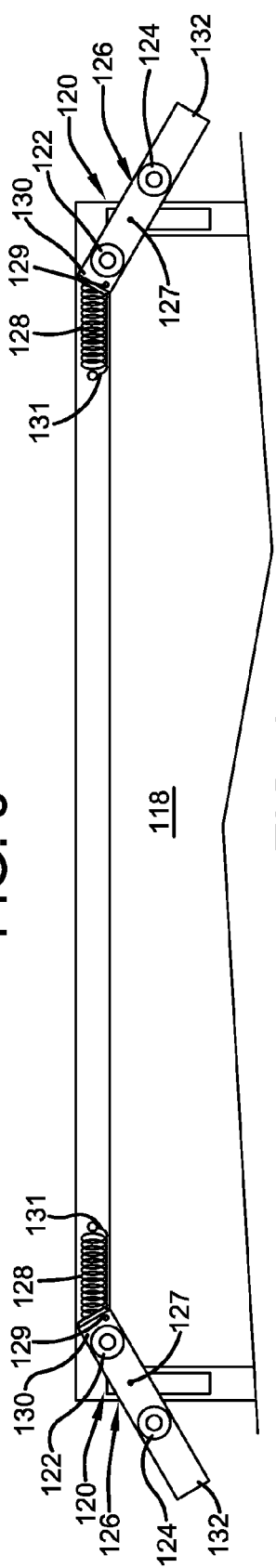
FIG. 6 is a rear elevation view of a first embodiment of a supplemental display board in accordance with this invention.
Figure 7:
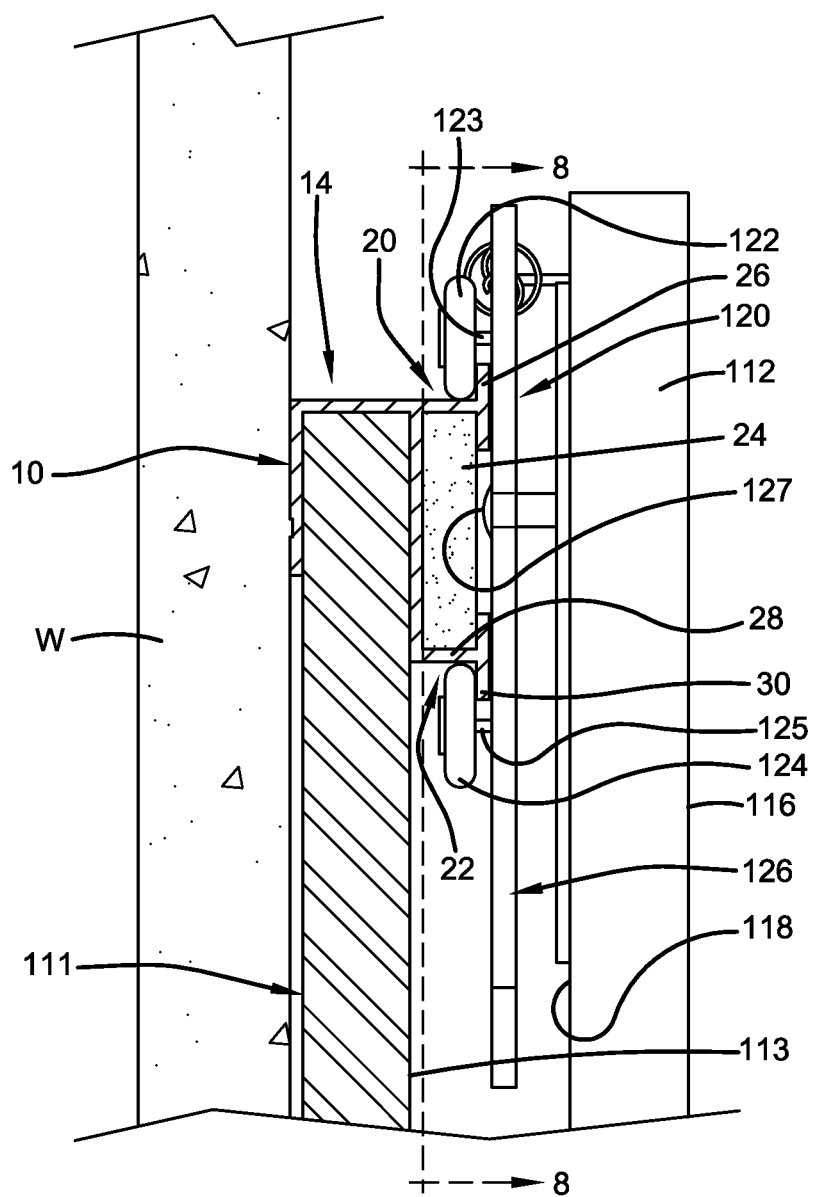
FIG. 7 is a side view of the relevant wheeled mounting assembly portion of the supplemental display board, showing the interaction between the wheeled mounting assembly and the map rail.
Figure 8:
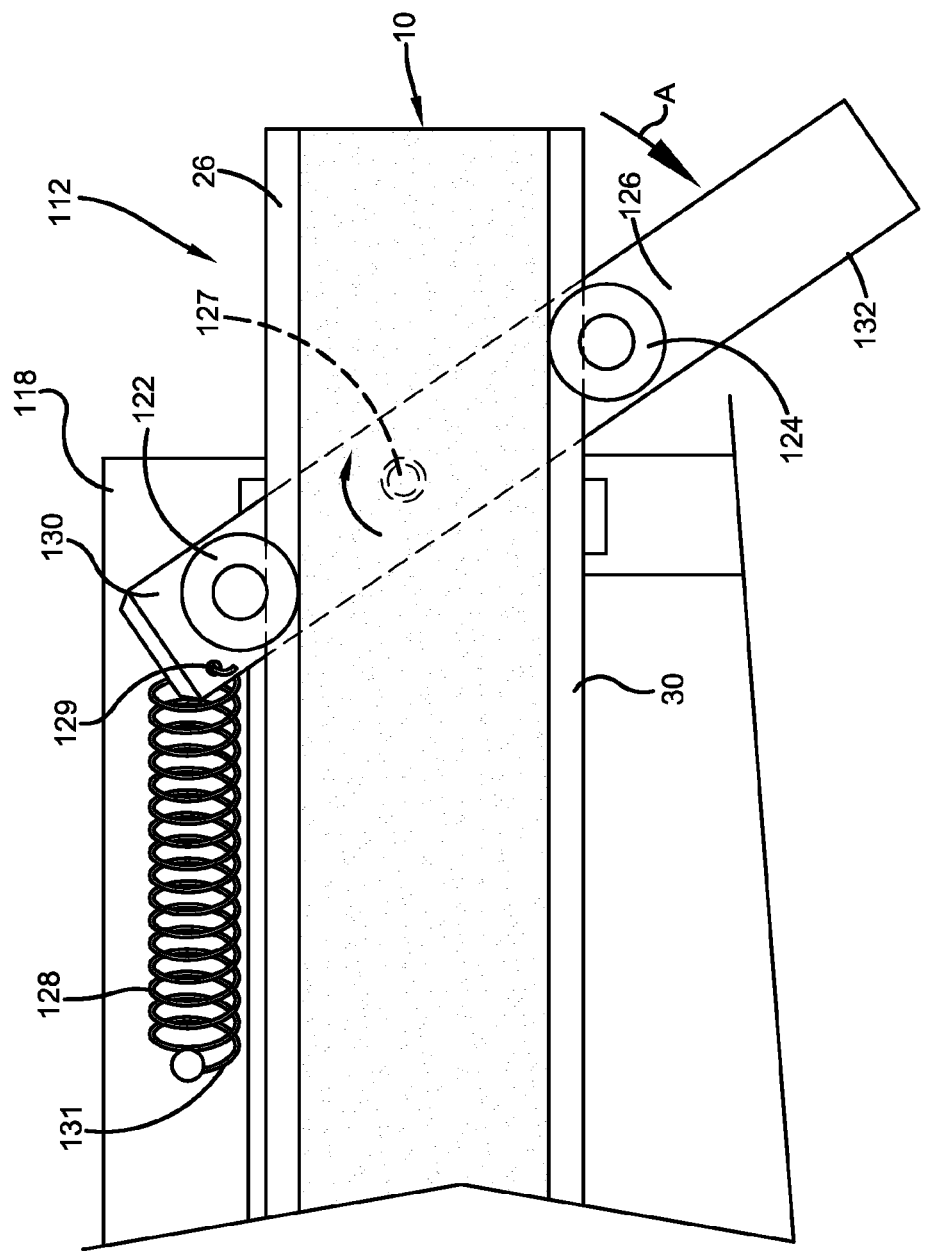
FIG. 8 is a cross section taken along the line 8-8 in FIG. 7.
Figure 9:
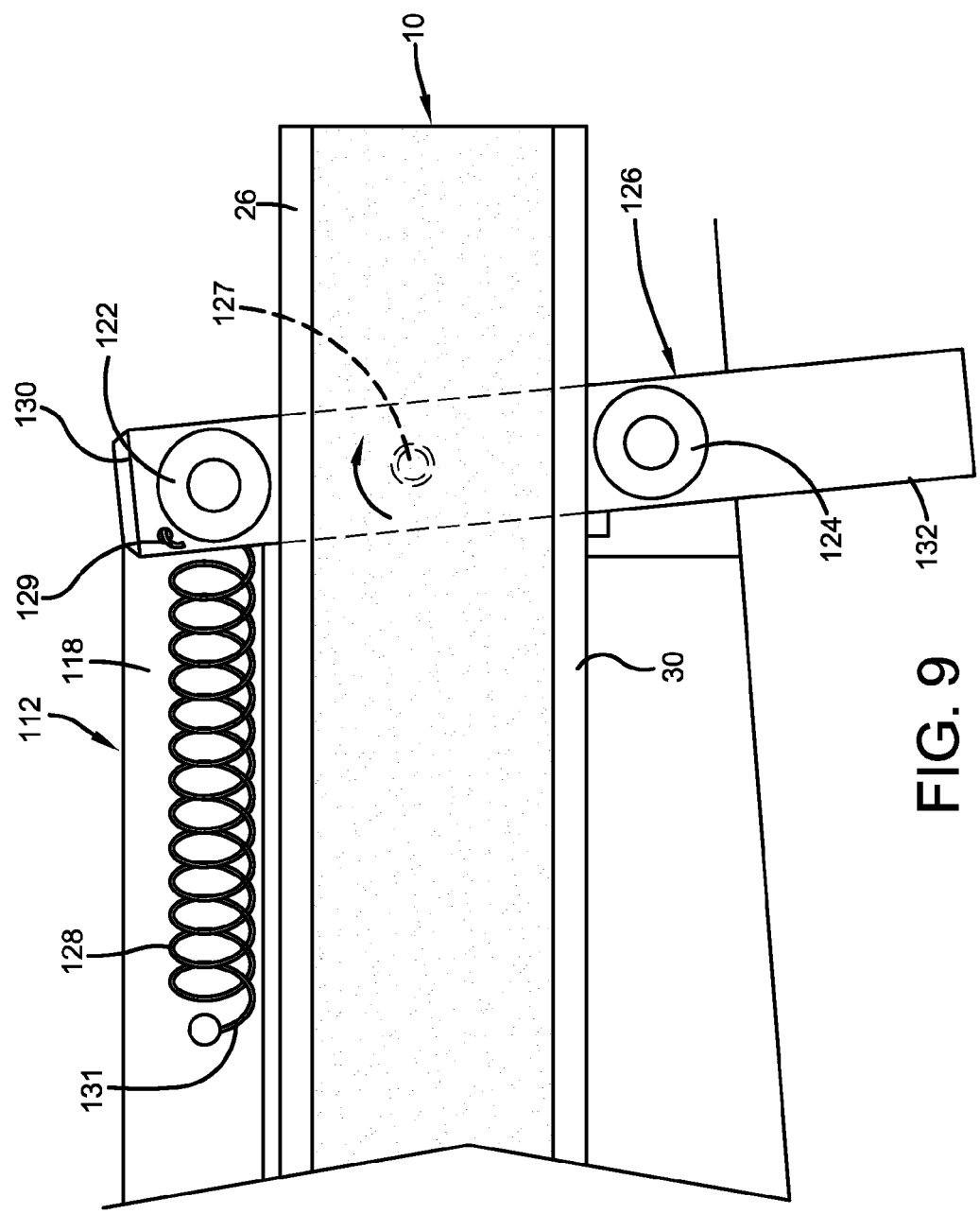
FIG. 9 is a cross section as in FIG. 8, shown with the wheeled mounting assembly manipulated to permit removal of the supplemental display board from the map rail.

As seen in FIGS. 5 and 6, the supplemental display board 112 includes a front surface 116 and a rear surface 118. The front surface 116 can provide any type of display board including a chalkboard, marker board, polar coordinate board, maps, graphs and the like. In order to mount the supplemental display board 112 to the map rail 10 of the primary display board 111, the rear surface 118 carries at least one wheeled mounting assembly 120. In the present embodiment, two wheeled mounting assemblies 120 are shown, one proximate a first side of the supplemental display board 112 and the other at the opposed side thereof. The wheeled mounting assembly 120 can be provided at virtually any location, though suitable locations will be chosen based on the balance of the supplemental display board 112, when secured to the map rail 10. For example, in the embodiment shown, the right and left side wheeled mounting assemblies are aligned horizontally by being placed at the appropriate height along the rear surface 118, and function as mirror images of one another to ensure that the supplemental display board 112 is secured in a level manner to the map rail 10. FIGS. 7-9 are provided to help disclose the mounting and removal of the supplemental display board 112 on the map rail 10. These figures focus on the right side wheeled mounting assembly 120, but it will be readily appreciated how additional wheeled mounting assemblies would be employed.

As seen in FIG. 7, the map rail 10 is secured to a primary display board 111 through a mounting bracket 14. The top track 20, defined by the top support rail 24 and top guard rail 26, and the bottom track 22, defined by the bottom support rail 28 and bottom guard rail 30 extend outwardly from the face 113 of the primary display board 111. The wheeled mounting assembly 120 engages the top and bottom tracks 20, 22 so as to be capable of sliding laterally along the tracks of the map rail 10.

More particularly, the wheeled mounting assembly 120 includes a top wheel 122 that is forced to engage the top track 20 and is confined by the top guard rail 26. Similarly, a bottom wheel 124 of the wheeled mounting assembly 120 is forced to engage the bottom track 22 and is confined by the bottom guard rail 30. The wheels 122, 124 are of a height such that their axles 123, 125 clear the height of their respective guard rails 26, 30. The top wheel 122 and bottom wheel 124 are mounted to a mounting rail 126 that is secured to the rear surface 118 of the supplemental display board 112 at a pivot point 127 positioned between the top wheel 122 and bottom wheel 124. The pivot point 127 could be created by an axle or pin or other structure. When the supplemental display board 112 is mounted to the map rail 10, a spring 128 serves to force the top wheel 122 into engagement with the top track 120 while also forcing the bottom wheel 124 to engage the bottom track 22. As seen, a first end 129 of the spring 128 is secured proximate an upper end 130 to the mounting rail 126. A second end 131 of the spring 128 is secured to the rear surface 118 of the supplemental display board 112. In particular embodiments, the spring 128 is a tension spring (or extension spring) that pulls movable upper end 129 of the mounting rail 126 toward the second end 121 secured to the supplemental display board 112. With the pivot point 127 between the top wheel 122 and bottom wheel 124, the top wheel 122 rotates in a direction to engage the top track 20, while the bottom wheel 124 rotates to contact the bottom track 22.

The spring 128 biases the mounting rail 126 in a first direction about the pivot point 127 so that wheels 122, 124 engage their respective tracks 20, 22 provided by the map rail 10. With one such wheeled mounting assembly 120 appropriately positioned at an area of center of gravity of the supplemental display board 112, it would be possible to employ one such wheeled mounting assembly 120 to secure a supplemental display 112 to a map rail 10. When a right side and left side wheeled mounting assembly is employed, such as that shown in FIGS. 5 and 6, it will be appreciated that a very sturdy and level mounting can be achieved. The supplemental display board 112 will be slidable on the top wheel 122 and bottom wheel 124 to different lateral positions along the map rail 10. In some embodiments, the supplemental display board 112 provides one or more board supporting wheels 134 that engage the front face of the primary display board (or, in the case of the map rail being mounted to a wall W, engage the face of the wall W) to prevent contact between the supplemental display board and the face of the primary display board (or face of the wall). Such board supporting wheels 134 would roll along the face of the board or wall as the supplemental display board is slid to different lateral positions along the map rail.

In order to remove the wheeled mounting assembly from its engagement with the map rail 10, the mounting rail 126 further includes a handle portion 132 that can be manipulated to counter the rotational bias force of the spring 128. Thus, in FIG. 8, while it is appreciated that spring 128 pulls the mounting rail 126 in a counterclockwise direction about the pivot point 127, the handle portion 132 can be manipulated in the direction of arrow A to cause rotation of the mounting rail about the pivot point 127 in a clockwise direction. Notably, the particular directions are immaterial, with the understanding that the spring provides rotational bias in one direction, while the handle can be employed to provide rotational movement in the opposite direction. By employing the handle portion 132 to counter the force of spring 128, the top wheel 122 and bottom wheel 124 can be moved to a vertical separation distance such that the top rail 122 clears the top guard rail 26, while the bottom wheel 124 clears the bottom guard rail 30. This is shown in FIG. 9. It will be appreciated that one can remove the supplemental display board 112 from the map rail 10 by employing the handle portion 132.

The spring 128 is employed to bias the wheels 122, 124 to a mounted position wherein they engage their respective tracks 20, 22. The handle portion 132 is manipulated to move the wheels 122, 124 to a removal position wherein they clear their respective guard rails 26, 30 and the supplemental display board 112 can be pulled away from the map rail 10 to remove it from the mounted position.

With reference to FIGS. 10-15 a second embodiment of a display assembly in accordance with the present invention is shown and designated by the numeral 210. This display assembly 210 includes a supplemental display board 212 mounted to a map rail 10 that is secured to a primary display board 111 that is, in turn, appropriately secured to a wall W. It will be appreciated that the map rail 10 could instead be mounted directly to a wall W to provide a separate embodiment of a display assembly in accordance with this invention. Of course, the disclosure of the securing of the supplemental display board 212 to a map rail 10 on a primary display board 111 will be sufficient for also teaching the concept of securing such a supplemental display to a map rail secured directly to a wall.

Figure 10:
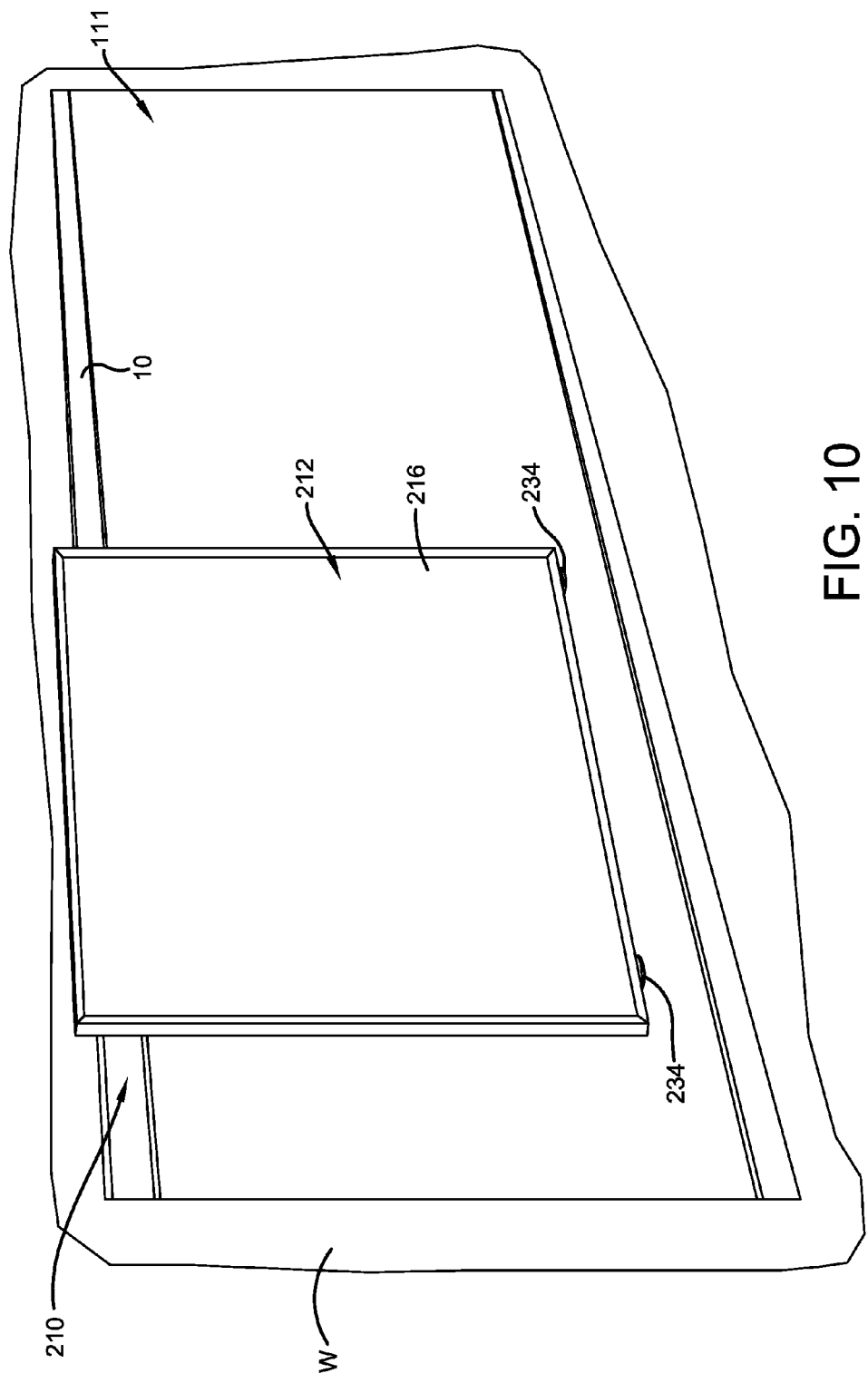
FIG. 10 is a front elevation view of a second embodiment of a display board assembly in accordance with this invention
Figure 11:
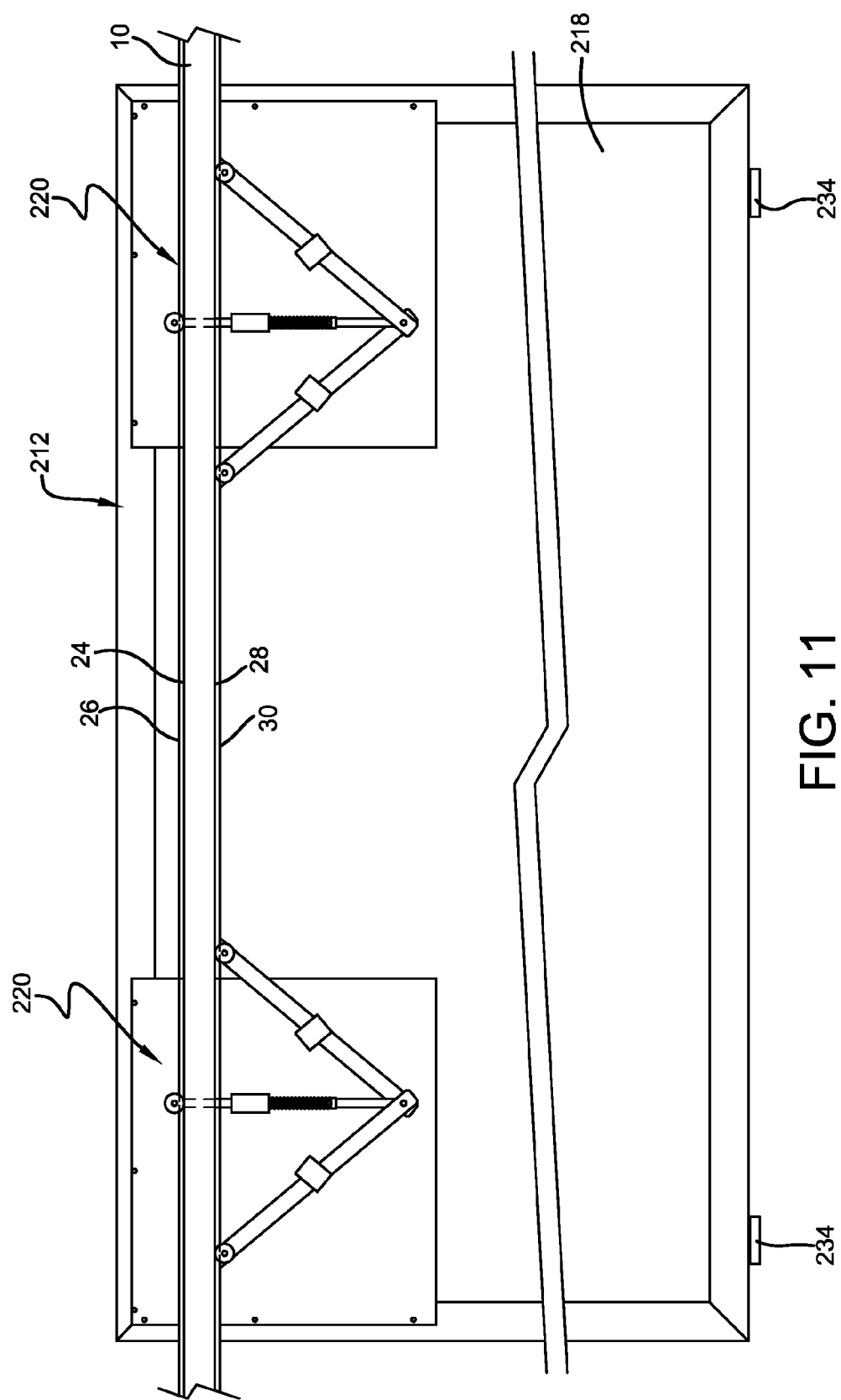
FIG. 11 is a rear elevation view of a first embodiment of a supplemental display board in accordance with this invention.
Figure 12:
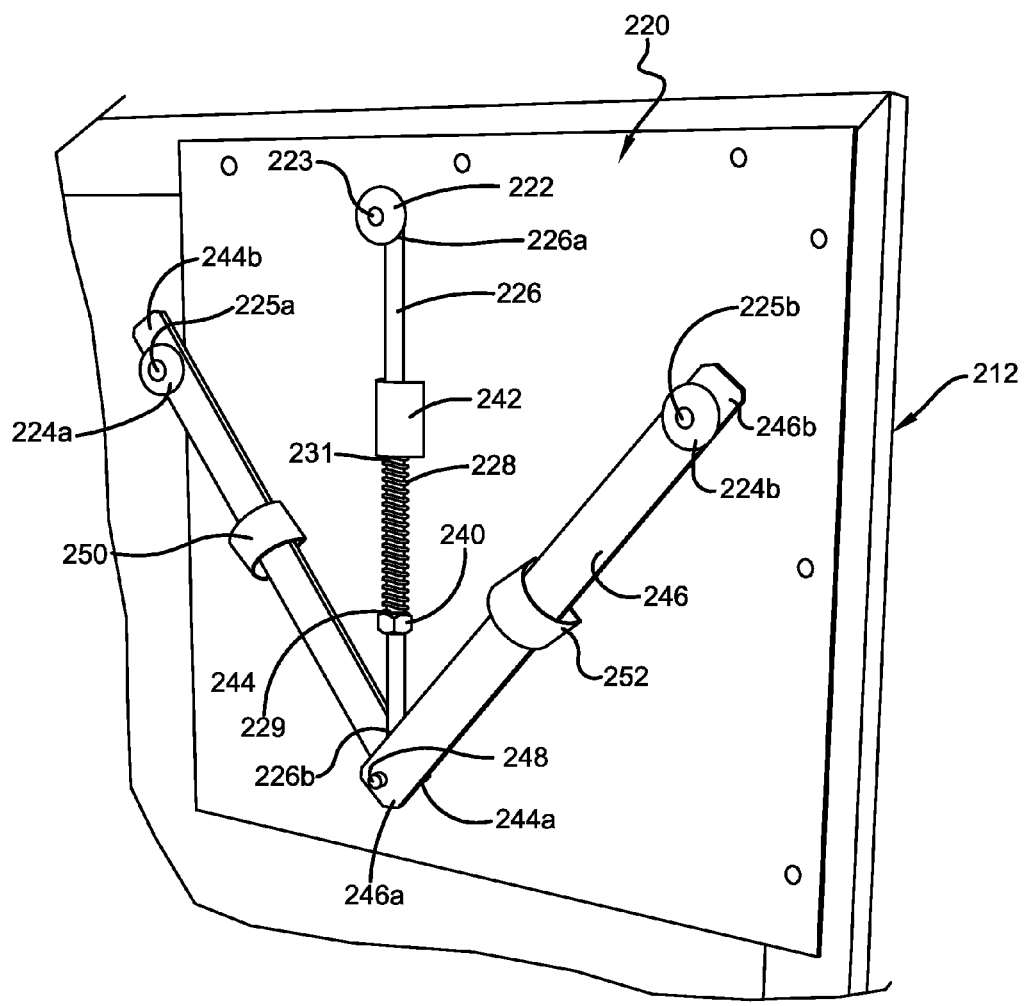
FIG. 12 is a rear elevation view as in FIG. 11, but showing only one wheeled mounting assembly to better allow for numbering of elements.

As seen in FIGS. 10 and 11, the supplemental display board 212 includes a front surface 216 and a rear surface 218. The front surface 216 can provide any type of display board including a chalkboard, marker board, polar coordinate board, maps, graphs and the like. In order to mount the supplemental display board 212 to the map rail 10 of the primary display board 111, the rear surface 218 carries at least one wheeled mounting assembly 220. In the present embodiment, two wheeled mounting assemblies 220 are shown, one proximate a first side of the supplemental display board 212 and the other at the opposed side thereof. The wheeled mounting assembly 220 can be provided at virtually any location, though suitable locations will be chosen based on the balance of the supplemental display board 212, when secured to the map rail 10. For example, in the embodiment shown, the right and left side wheeled mounting assemblies are aligned horizontally by being placed at the appropriate height along the rear surface 218, and function as mirror images of one another to ensure that the supplemental display board 212 is secured in a level manner to the map rail 10. FIGS. 11-15 are provided to help disclose the mounting and removal of the supplemental display board 212 on the map rail 10. These figures focus on the right side wheeled mounting assembly 220, but it will be readily appreciated how additional wheeled mounting assemblies would be employed.

Figure 13:
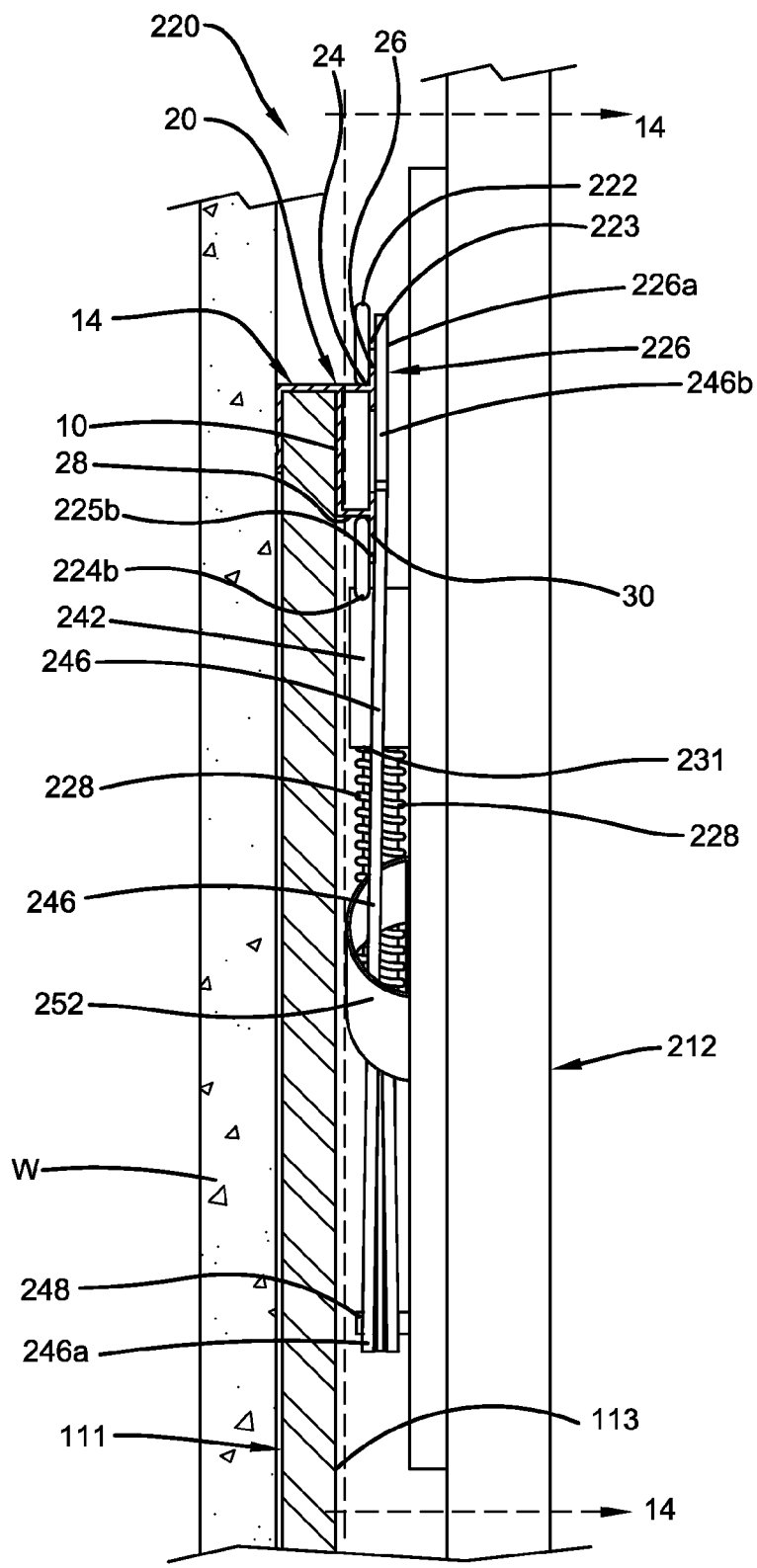
FIG. 13 is a side view of the relevant wheeled mounting assembly portion of the supplemental display board, showing the interaction between the wheeled mounting assembly and the map rail.
Figure 14:
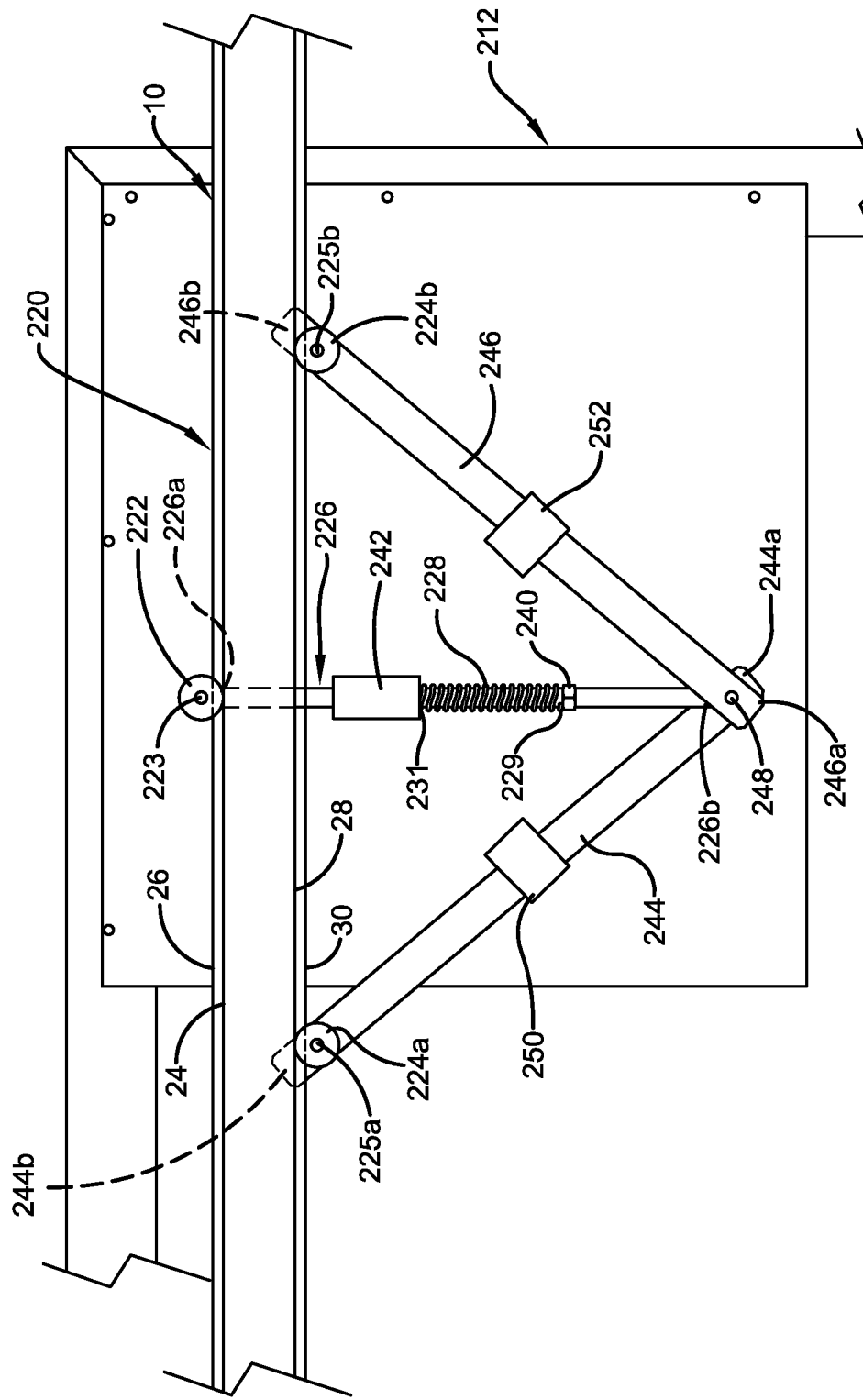
FIG. 14 is a cross section taken along the line 14-14 in FIG. 13.
Figure 15:
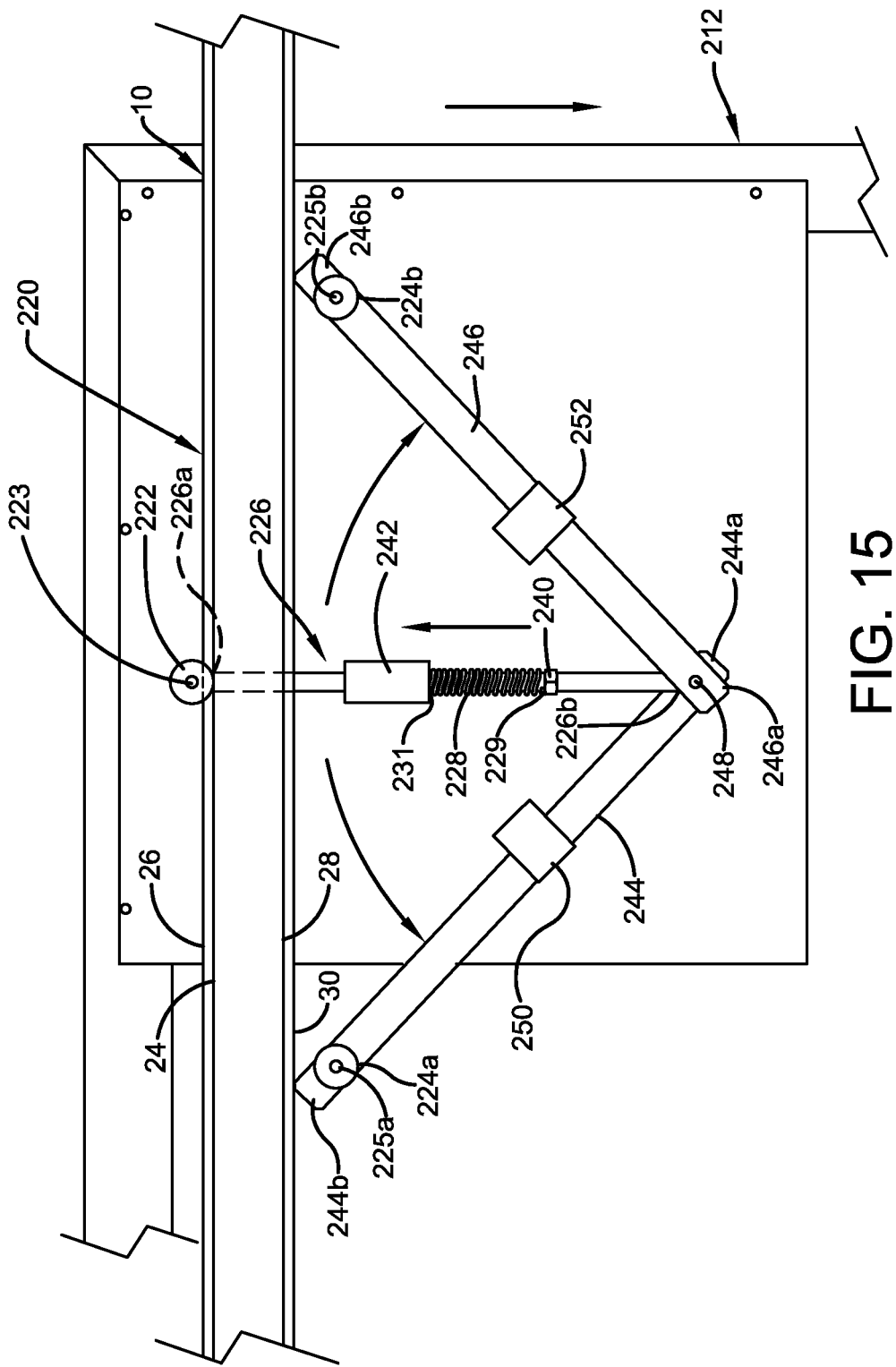
FIG. 15 is a cross section as in FIG. 14, shown with the wheeled mounting assembly manipulated to permit removal of the supplemental display board from the map rail

As seen in FIG. 13, the map rail 10 is secured to a primary display board 111 through a mounting bracket 14. The top track 20, defined by the top support rail 24 and top guard rail 26, and the bottom track 22, defined by the bottom support rail 28 and bottom guard rail 30 extend outwardly from the face 113 of the primary display board 111. The wheeled mounting assembly 220 engages the top and bottom tracks 20, 22 so as to be capable of sliding laterally along the tracks of the map rail 10.

More particularly, the wheeled mounting assembly 220 includes a top wheel 222 that is forced to engage the top track 20 and is confined by the top guard rail 26. Similarly, a first bottom wheel 224a and second bottom wheel 224b of the wheeled mounting assembly 220 are forced to engage the bottom track 22 and are confined by the bottom guard rail 30. The wheels 222, 224a and 224b are of a height such that their axles 223, 225a, 225b clear the height of their respective guard rails 26, 30. The top wheel 222 is secured to mounting rail 226 at an upper end 226a thereof. A spring 228 forces the mounting rail 226 and thus the top wheel 222 in a direction downward relative to the top of the supplemental display board 212. In this embodiment, the spring 228 is a compression spring that acts between a spring mount 240, which is secured to the mounting rail 226, and a rail guide 242, which is secured to the supplemental display board 212. The compression spring acts to separate the spring mount 240 from the rail guide 242, thus urging the mounting rail 226 downwardly, as already noted. In some embodiments, a first end 229 of the spring 228 is secured to the spring mount 240 and a second end 231 of the spring 228 is secured to the rail guide 242. In some embodiments the rail guide 242 is positioned between the spring 228 and the top wheel 222.

A left wheel arm 244 has a proximal end 244a and a distal end 244b. The left wheel arm 244 is pivotally mounted to a lower end 226b of the mounting rail 226 at the proximal end 244a of the left wheel arm 244, and the bottom wheel 224a is mounted to rotate on its axle 225a at the distal end 244b of the left wheel arm 244. A right wheel arm 246 has a proximal end 246a and a distal end 246b. The right wheel arm 246 is pivotally mounted to the lower end 226b of the mounting rail 226 at the proximal end 246a of the right wheel arm 248, and the second bottom wheel 224b is mounted to rotate on its axle 225b at the distal end 246b of the right wheel arm 246. In some embodiments, the left wheel arm 244 and the right wheel arm 246 are pivotally secured to the lower end 226b of the mounting rail 226 by a common axle 248.

The left wheel arm 244 is confined in movement by a left arm guide 250 positioned between the proximal end 244a and the distal end 244b of the left wheel arm 244, and the right wheel arm 246 is confined in movement by a right arm guide 252 positioned between the proximal end 246a and the distal end 246b of the right wheel arm 246. Thus, when movement of the mounting rail 226 causes the right wheel arm 246 to move, contact between the right wheel arm 246 and the right arm guide 252 causes the right wheel arm 246 to pivot relative to the mounting rail 226, and, when movement of the mounting rail 226 causes the left wheel arm 244 to move, contact between the left wheel arm 244 and the left arm guide 250 causes the left wheel arm 244 to pivot relative to the mounting rail 226. In some embodiments, as the mounting rail 226 moves downwardly, the proximal ends 244a, 246a of the left and right wheel arms 244, 246 are moved downwardly and the distal ends 244b, 246b and hence bottom wheel 224a and bottom wheel 224b are moved upwardly, because the arms 244, 246 are confined by the guides 250, 252.

The supplemental display board 212 hangs from the map rail 10 on the top wheel 222, and the spring 228 applies a downward force to the mounting rail 226 by pressing between the spring mount 240 and the rail guide 242 the top wheel 222 relative to the supplemental display board 212, the downward force being transferred to upward force on the bottom wheel 224a through the left wheel arm 244 and the left arm guide 250 and the downward force being transferred to upward force on the second bottom wheel 224b through the right wheel arm 246 and the right arm guide 252 so as to pinch the map rail 10 between the top wheel 222 and the bottom and second bottom wheels 224a, 224b.

The spring 228 biases the mounting rail 226 such that pressing downwardly on the supplemental display board 212 to place weight on the top wheel 222 against the top support rail 24 moves the mounting rail 226 upwardly relative to the supplemental display board 212, and this upward movement is transferred to downward movement of the bottom wheel 224a through interaction of the left wheel arm 244 and the left arm guide 250 and this upward movement is transferred to downward movement of the second bottom wheel 224b through interaction of the right wheel arm 246 and the right arm guide 252 such that the bottom wheel 224a and the second bottom wheel 224b are moved to a vertical separation distance from the top wheel 22 such that the bottom wheel 224a and the second bottom wheel 224b clear the bottom guard rail 30 so as to no longer be confined thereby and permit removal of the supplemental display board 212.

In some embodiments, the spring 228 is a compression spring and the left wheel arm 244 and the right wheel arm 246 each extend through their respective left arm guide 250 and right arm guide 252 at an acute angle relative to the mounting rail 226. Thus, as the mounting rail 226 moves upwardly relative to the rail guide 242, against the force of the compression spring 228, the proximal ends 244a of the left wheel arm 244 and the proximal end 246a of the right wheel arm 246 are moved upwardly. The left arm guide 250 defines a pivoting point for the left wheel arm 244, such that the distal end 244b and wheel 224a pivot downwardly. Similarly, the right arm guide 252 defines a pivoting point for the right wheel arm 246, such that the distal end 246b and wheel 224b pivot downwardly. The movement of the top wheel 22 upwardly coupled with the rotation of the bottom wheel 224a and second bottom wheel 224b downwardly allows the wheels to be secured to and removed from the map rail.

For example, in some embodiments, when the compression spring is uncompress, the rest position of the top wheel 222 relative to the bottom wheel 224a and second bottom wheel 224b is structured so that the vertical separation distance between the top wheel and the bottom wheel and second bottom wheel is less than or equal to the distance between the top support rail 24 and the bottom support rail 28. This will ensure that the map rail 10 is pinched between the wheels to mount the supplemental display board in a stable manner. The aforementioned movement of the top wheel 22 upwardly coupled with the rotation of the bottom wheel 224a and second bottom wheel 224b downwardly allows one to pull down on the supplemental display board 212 to pull the top wheel 222 against the top support rail 24, thus pulling the mounting rail 226 against the spring 228, rotating the bottom wheels 224a, 224b down so as to clear the bottom guard rail 30 and allow for removal of the supplemental display board 212, by removing the bottom wheels 224a, 224b from the bottom track 22.

Conscious and calculated placement of elements and choice of lengths and other dimensions and choice of material affecting relative weights and choice of spring strenghs will cause this system to work for map rails of various dimensions for various supplemental display boards.

In some embodiments, the spring 228 is a compression spring and is strong enough to resist compression under the weight it experiences from the supplemental display board 212 when hung on the map rail 10. Additionally, in some embodiments, when the compression spring is uncompress, the rest position of the top wheel 222 relative to the bottom wheel 224a and second bottom wheel 224b the vertical separation distance between the top wheel and the bottom wheel and second bottom wheel is less than or equal to the distance between the top support rail 24 and the bottom support rail 28. This will ensure that the map rail 10 is pinched between the wheels to mount the supplemental display board in a stable manner. Additionally, in some embodiments the compression spring is only slightly resists the weight it experiences from the supplemental display board 212 when hung on the map rail 10, such that one can readily mount and remove the supplemental display board by applying pressure to the top wheel against the top support rail 24.

With one such wheeled mounting assembly 220 appropriately positioned at an area of center of gravity of the supplemental display board 212, it would be possible to employ one such wheeled mounting assembly 220 to secure a supplemental display 212 to a map rail 10. When a right side and left side wheeled mounting assembly is employed, such as that shown, it will be appreciated that a very sturdy and level mounting can be achieved. The supplemental display board 212 will be slidable on the top wheel 222 and bottom wheels 224a, 224b to different lateral positions along the map rail 10. In some embodiments, the supplemental display board 212 provides one or more board supporting wheels 234 that engage the front face of the primary display board (or, in the case of the map rail being mounted to a wall W, engage the face of the wall W) to prevent contact between the supplemental display board and the face of the primary display board (or face of the wall). Such board supporting wheels 134 would roll along the face of the board or wall as the supplemental display board is slid to different lateral positions along the map rail.

In light of the foregoing, it should be appreciated that the present invention significantly advances the art by providing display board assemblies that are structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A display board assembly comprising:
   a map rail including:
      a top track defined by a top support rail and a top guard rail, and
      a bottom track defined by a bottom support rail and a bottom guard rail; and
   a supplemental display board having a wheeled mounting assembly on a rear surface thereof, said wheeled mounting assembly including:
      a top wheel forced to engage said top track and confined by the top guard rail, and
      a bottom wheel forced to engage said bottom track and confined by the bottom guard rail,
   wherein the supplemental display board is slidable on said top wheel and bottom wheel to different lateral positions on said map rail.

2. The display board assembly of claim 1, wherein said wheeled mounting assembly includes a mounting rail, said top wheel mounted to said mounting rail.

3. The display board assembly of claim 1, further comprising a primary display board, said map rail mounted to said primary display board.

4. The display board assembly of claim 3, wherein said supplemental display board includes a board supporting wheel that engages a face of the primary display board to prevent contact between the supplemental display board and the face of the primary display board.

5. A display board assembly comprising:
   a map rail including:
      a top track defined by a top support rail and a top guard rail, and
      a bottom track defined by a bottom support rail and a bottom guard rail; and
   a supplemental display board having a wheeled mounting assembly on a rear surface thereof, said wheeled mounting assembly including:
      a top wheel forced to engage said top track and confined by the top guard rail, and
      a bottom wheel forced to engage said bottom track and confined by the bottom guard rail,
   wherein the supplemental display board is slidable on said top wheel and bottom wheel to different lateral positions on said map rail, wherein said wheeled mounting assembly includes a biasing member urging said top wheel to engage said top track and said bottom wheel to engage said bottom track.

6. The display board assembly of claim 5, wherein said wheeled mounting assembly includes a mounting rail, said top wheel and said bottom wheel being mounted to said mounting rail.

7. The display board assembly of claim 6, wherein said mounting rail is pivotally mounted to said supplemental display board at a pivot point, and said spring is secured to said mounting rail and said supplemental display board to bias said mounting rail in a first direction about said pivot point.

8. The display board assembly of claim 7, wherein said mounting rail further includes a handle portion manipulated in a second direction about said pivot point to rotate said mounting rail counter to the bias of said spring.

9. The display board assembly of claim 8, wherein said top wheel and said bottom wheel are mounted to said mounting rail such that said handle portion is capable of manipulation to rotate said mounting rail such that said top wheel and said bottom wheel are moved to a vertical separation distance such that said top wheel clears said top guard rail and said bottom wheel clears said bottom guard rail so as to no longer be confined thereby and permit removal of the supplemental display board.

10. The display board of claim 5, wherein said biasing member is a spring.

11. A display board assembly comprising:
a map rail including:
a top track defined by a top support rail and a top guard rail, and
a bottom track defined by a bottom support rail and a bottom guard rail; and
a supplemental display board having a wheeled mounting assembly on a rear surface thereof, said wheeled mounting assembly including:
a top wheel forced to engage said top track and confined by the top guard rail, and
a bottom wheel forced to engage said bottom track and confined by the bottom guard rail, wherein the supplemental display board is slidable on said top wheel and bottom wheel to different lateral positions on said map rail, wherein said wheeled mounting assembly includes a mounting rail, said top wheel mounted to said mounting rail, and wherein said wheeled mounting assembly includes a spring acting between said mounting rail and said supplemental display board, said spring forcing said top wheel in a direction downward from a top of said supplemental display board.

12. The display board assembly of claim 11, wherein said wheeled mounting assembly includes:
a second bottom wheel forced to engage said bottom track and confined by the bottom guard rail;
a left side wheel arm having a proximal end and a distal end, said proximal end being pivotally mounted to said mounting rail such that movement of said mounting rail causes said left side wheel arm to move; and
a right side wheel arm having a proximal end and a distal end, said proximal end being pivotally mounted to said mounting rail such that movement of said mounting rail causes said right side wheel arm to move;
wherein said bottom wheel is secured to said distal end of said left side wheel arm and said second bottom wheel is secured to said distal end of said right side wheel arm guide.

13. The display board assembly of claim 12, wherein said left side wheel arm is confined in movement by a left side arm guide positioned between said proximal end and said distal end of said left side wheel arm, and said right side wheel arm is confined in movement by a right side arm positioned between said proximal end and said distal end of said right side wheel arm, such that, when movement of said mounting rail causes said right side wheel arm to move, contact between said right side wheel arm and said right side arm guide causes said right side wheel arm to pivot relative to said mounting rail, and, when movement of said mounting rail causes said left side wheel arm to move, contact between said left side wheel arm and said left side arm guide causes said left side wheel arm to pivot relative to said mounting rail.

14. The display board assembly of claim 13, wherein said supplemental display board hangs from said map rail on said top wheel, and said spring applies a downward force to said mounting rail and said top wheel relative to the supplemental display board, said downward force being transferred to upward force on said bottom wheel through said left side transfer arm and said left side arm guide and said downward force being transferred to upward force on said second bottom wheel through said right side transfer arm and said right side arm guide so as to pinch the map rail between the top wheel and the bottom and second bottom wheels.

15. The display board assembly of claim 14, wherein said spring biases said mounting rail such that pressing downwardly on the supplemental display board to place weight on said top wheel against said top support rail moves said mounting rail upwardly relative to said supplemental display board and this upward movement is transferred to downward movement of said bottom wheel through interaction of said left side transfer arm and said left side arm guide and this upward movement is transferred to downward movement of said second bottom wheel through interaction of said right side transfer arm and said right side arm guide such that said bottom wheel and said second bottom wheel are moved to a vertical separation distance from said top wheel such that said bottom wheel and aid second bottom wheel clear said bottom guard rail so as to no longer be confined thereby and permit removal of the supplemental display board.

* * * * *